United States Patent
Tai et al.

(10) Patent No.: US 10,635,884 B2
(45) Date of Patent: Apr. 28, 2020

(54) SYSTEM AND METHOD FOR FINGERPRINT RECOGNITION

(71) Applicant: Moqi Inc., Beijing (CN)

(72) Inventors: Cheng Tai, Beijing (CN); Linpeng Tang, Princeton, NJ (US)

(73) Assignee: Moqi Inc., Beijing (CN)

( * ) Notice: Subject to any disclaimer, the term of this patent is extended or adjusted under 35 U.S.C. 154(b) by 143 days.

(21) Appl. No.: 16/004,239

(22) Filed: Jun. 8, 2018

(65) Prior Publication Data
US 2018/0357467 A1   Dec. 13, 2018

Related U.S. Application Data

(60) Provisional application No. 62/516,905, filed on Jun. 8, 2017.

(51) Int. Cl.
*G06K 9/00* (2006.01)
(52) U.S. Cl.
CPC ..... *G06K 9/00087* (2013.01); *G06K 9/00067* (2013.01)
(58) Field of Classification Search
CPC .......... G06K 9/00087; G06K 9/00067; G06K 9/4609
See application file for complete search history.

(56) References Cited

U.S. PATENT DOCUMENTS

| 2007/0297653 | A1 | 12/2007 | Bolle et al. | |
| 2008/0253625 | A1* | 10/2008 | Schuckers | G06K 9/00114 382/125 |
| 2015/0131906 | A1* | 5/2015 | Arai | G06T 5/20 382/167 |

OTHER PUBLICATIONS

Christensen, O., "Wavelet Frames and the Unitary Extension Principle," Feb. 29, 2016, 25 pages, [Online] [Retrieved on Oct. 19, 2018] Retrieved from the Internet<URL:https://www.fim.uni-passau.de/fileadmin/files/lehrstuhl/forster-heinlein/Bernried2016/2016BernriedII.pdf>.
European Extended Search Report, European Application No. 18176722.9, dated Oct. 29, 2018, 8 pages.

* cited by examiner

*Primary Examiner* — Phuoc Tran
(74) *Attorney, Agent, or Firm* — Fenwick & West LLP (57) ABSTRACT

Fingerprint matching may include one or more of the following techniques. Space-frequency representations are adaptively computed for one or more fingerprint images. Key feature points of the fingerprint images are automatically extracted. Mesoscopic features are extracted based on the key feature points and the space-frequency representations. Fingerprint images are matched against a database of known fingerprint images using a matching algorithm based on the key points and mesoscopic features of the fingerprint images. Deep neural networks may be used for some or all of these steps.

20 Claims, 5 Drawing Sheets

SYSTEM AND METHOD FOR FINGERPRINT RECOGNITION

CROSS-REFERENCE TO RELATED APPLICATION(S)

This application claims priority under 35 U.S.C. § 119(e) to U.S. Provisional Patent Application Ser. No. 62/516,905, "System and Method for Fingerprint Recognition," filed Jun. 8, 2017. The subject matter of all of the foregoing is incorporated herein by reference in its entirety.

BACKGROUND

1. Technical Field

This disclosure relates generally to fingerprint recognition.

2. Description of Related Art

There exist two types of verifications for fingerprint identification, 1:1 verification and 1:N verification. In 1:1 verification, there is one fingerprint enrolled on a device, and the only verification is whether the attempted user is the correct match to the enrolled fingerprint. A nonlimiting example includes fingerprint verification to unlock a phone. By contrast, 1:N verification involves searching a fingerprint against a large database which may contain thousands to billions of fingerprint images to determine the identity of the fingerprint. This recognition is also referred to as latent fingerprint matching, where "latent" fingerprint may refer to the accidental impression of a fingerprint rather than one deliberately collected from a subject. A nonlimiting example includes crime scene fingerprint matching. Problems with 1:N verification include the fingerprint exhibiting poor quality or distortion, or only a small portion of the fingerprint is usable for matching purposes.

Conventional fingerprint identification technologies have been successfully used in solving crimes when the database of fingerprints is small or medium size. The conventional procedure for using fingerprints in solving crimes typically includes three steps: fingerprint acquisition, forensic experts mark features, and matching backend.

In fingerprint acquisition, the police or another investigative body collects the fingerprint from the crime scene. Depending on the surface where the fingerprint is attached, different methods may be used. For instance, on a flat surface, a multi-spectrum lighting source may be used to make the fingerprint visible. If the fingerprint is attached to a curtain or other fabric, chemical compounds may be used to make the fingerprint more visible in order to take a photo. Ultimately, a set of fingerprint images will be obtained.

In the next step, the fingerprint images are taken back to an office or lab for forensic experts to mark specific features. Typically, one fingerprint takes about half an hour to mark, and an entire crime scene could take about ten hours.

In the last step, the marked features are sent to a matching backend to find the top candidates from the database. This typically takes about a few hours to complete. Conventional technologies rely heavily on minutia features of the fingerprint for matching. Minutia (or micro-scale) features include ending and bifurcations of the ridge/valley lines in the fingerprint, as nonlimiting examples. Macro-scale features, such as r, may also be used to perform filtering to accelerate the process.

However, as fingerprint databases become increasingly larger and the number of queries increases, conventional technology does not scale well to meet the demands. Four problems are particularly severe: (1) accuracy deteriorates as the number of fingerprints in the database increases; (2) the process is slow; (3) the process requires expert labor, which increases cost; and (4) past data and expert experiences are not leveraged, for example through machine learning or artificial intelligence.

SUMMARY

Embodiments of the present invention may improve over conventional technologies in terms of speed, accuracy, and automation. Embodiments of the present invention may include some or all of the following features. In additional to traditional minutia-based feature points, various embodiments may include other learned features, including mesoscopic features. Traditional methods may also be integrated with big data processing technologies, such as distributed computing and storage systems, and active deep learning, as nonlimiting examples. Advanced acceleration methods may be tailored to multi-scale features. Embodiments of the present invention learn from past data and experiences and improve in accuracy with continued use.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION

Figure 1:
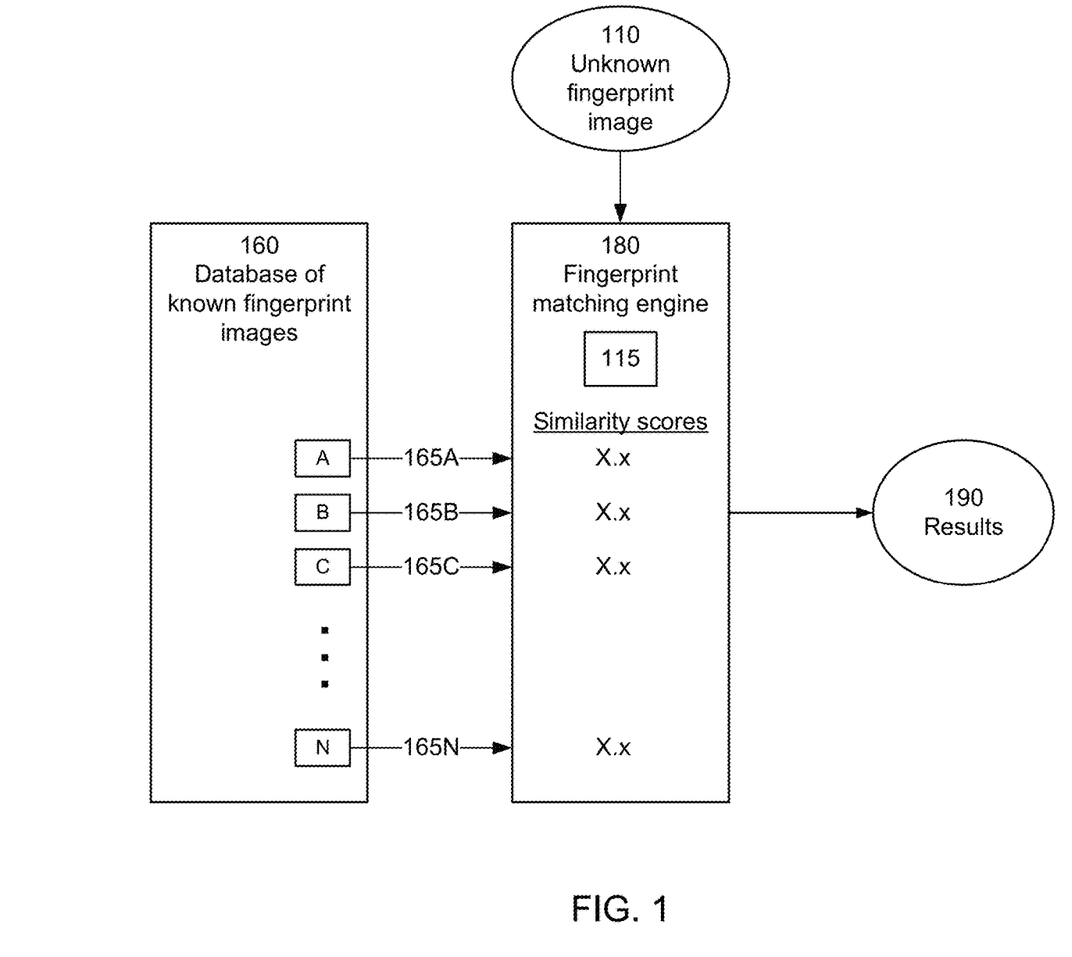
FIG. 1 is a diagram of a system for matching fingerprints.

FIG. 1 is a diagram of a system for matching fingerprints. The system includes a database 160 of known fingerprint images A, B, C, etc., which typically have been pre-processed to produce representations 165A,B,C, etc. that will be used for matching against an unknown fingerprint image 110. In FIG. 1, the representations 165 are mesoscopic features. Mesoscopic features are features that lie in between the micro-scale, which roughly corresponds to one pixel in the image, and the macro-scale, which roughly corresponds to the entire image. Micro-scale features are minutia features, such as the ending or bifurcations of the ridge/valley lines in the fingerprint. Macro-scale features include core and delta finger types. As described in the examples below, mesoscopic features are developed based on space-frequency representations of the fingerprint images.

In particular, a space-frequency framelet basis is optimized to represent fingerprint images. By analyzing the known fingerprint images, a framelet basis with sparsity is developed. This is achieved, in part, by relaxing the orthogonality requirement. Furthermore, because of the approach selected, neural networks can be successfully deployed to implement various components within the fingerprint matching task.

Returning to FIG. 1, a fingerprint matching engine 180 automatically extracts mesoscopic features 115 from the unknown fingerprint image 110. In one approach, space-frequency representations of the unknown fingerprint image are computed, for example by applying the analysis operator of the framelet basis to obtain a set of multi-dimensional coefficients. These representations may be enhanced using a deep neural network, which may be fully convolutional or including convolutional and fully connected layers. Key feature point candidates are extracted and these may be refined based on the quality of the surrounding vicinity. A sample patch of a predefined or adaptively chosen size around the key feature points is obtained, where the distortion of the patch preferably is corrected. The mesoscopic embedding features 115 from the patches are computed, for example using one or more deep neural networks. Dual-stream and single-stream neural networks are two nonlimiting examples of the deep neural networks used.

The fingerprint matching engine 180 matches the unknown fingerprint image 110 against the database of known fingerprint images A,B,C, etc. based on their mesoscopic features 115 and 165A,B,C, etc. In one approach, the features are organized into structured arrays. The features are stored and expanded in memory using a geometric hashing method. A similarity score of the features is computed based on a distance metric. For example, the Hamming distance may be used to measure the similarity of the features. In one approach, pair-wise similarity scores are calculated for different pairs of mesoscopic features, one from the unknown fingerprint image and one from a known fingerprint image. These are combined to obtain an overall similarity score, shown as X.x in FIG. 1.

The known fingerprint images may be ordered based on their similarity scores for the unknown fingerprint image 110. Different results 190 may be provided: an ordered list or a matching result based on pre-defined thresholds.

The framelet basis, the analysis operator for the framelet basis and the mesoscopic features 165 for the known fingerprint images may all be calculated in advance and stored either in the database 160 or with the fingerprint matching engine 180.

Figure 2:
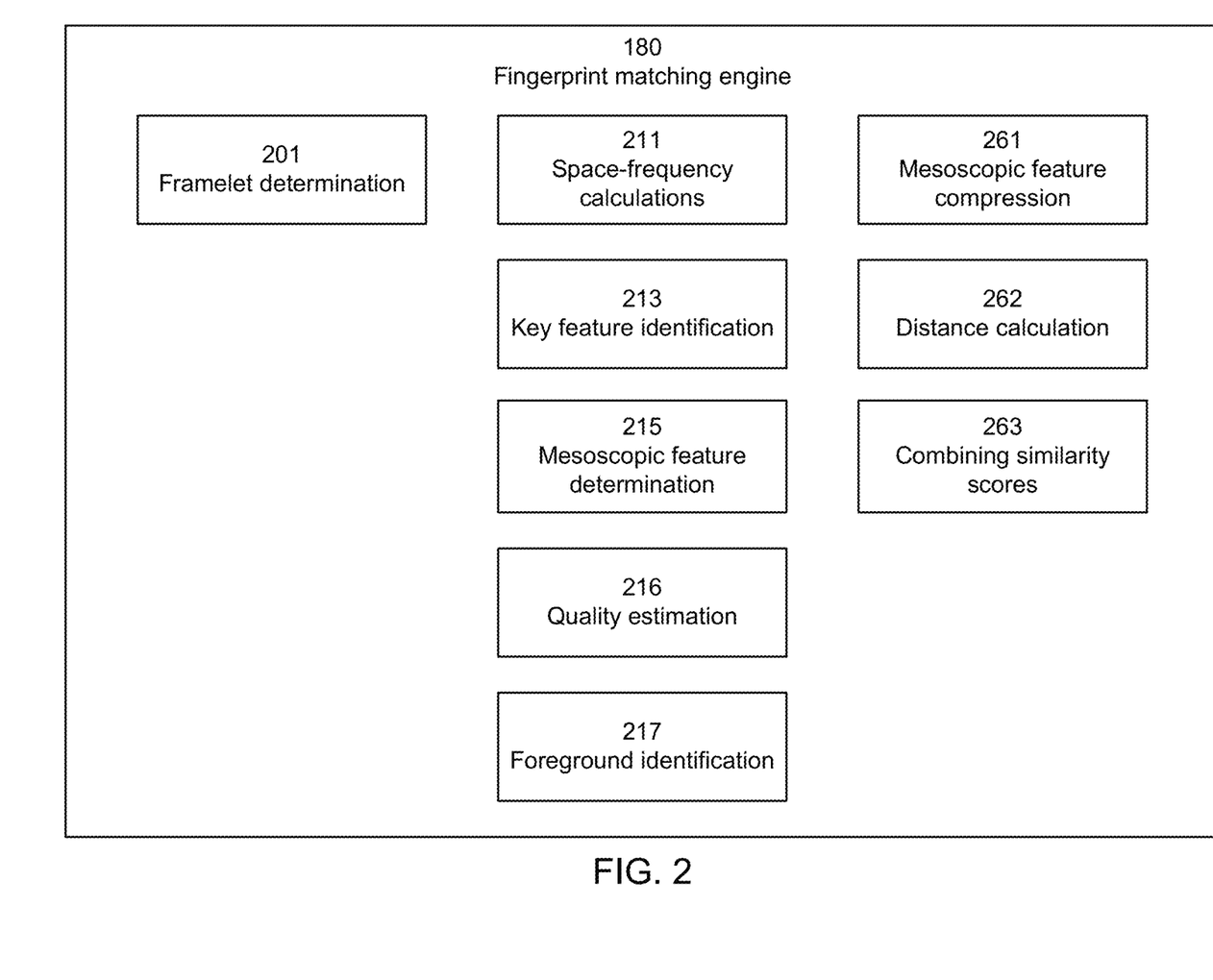
FIG. 2 is a block diagram of a fingerprint matching engine.

FIG. 2 is a block diagram of a fingerprint matching engine. The engine 180 includes different modules, represented as blocks in FIG. 2. The blocks are organized into three columns. The left column contains modules used to initialize the overall framework. This includes a module 201 that determines the framelet basis that will be used. The middle column contains modules used in obtaining representations of fingerprint images. This includes applying the analysis operator for the framelet basis 211, identifying key features in the resulting space-frequency representation 213, and determining mesoscopic features for the key features 215. It also includes tasks such as quality estimation 216 and foreground/background identification 217, which can be used to improve the fingerprint representations. The right column contains modules used to compare different fingerprints. This includes feature compression such as compression to bit vectors 261, distance or similarity calculations for pairs of mesoscopic features 262, and combining the pair-wise similarity scores into an overall similarity score for two fingerprint images 263. As described below, deep neural networks may be trained to perform some of these functions.

Figure 3A:
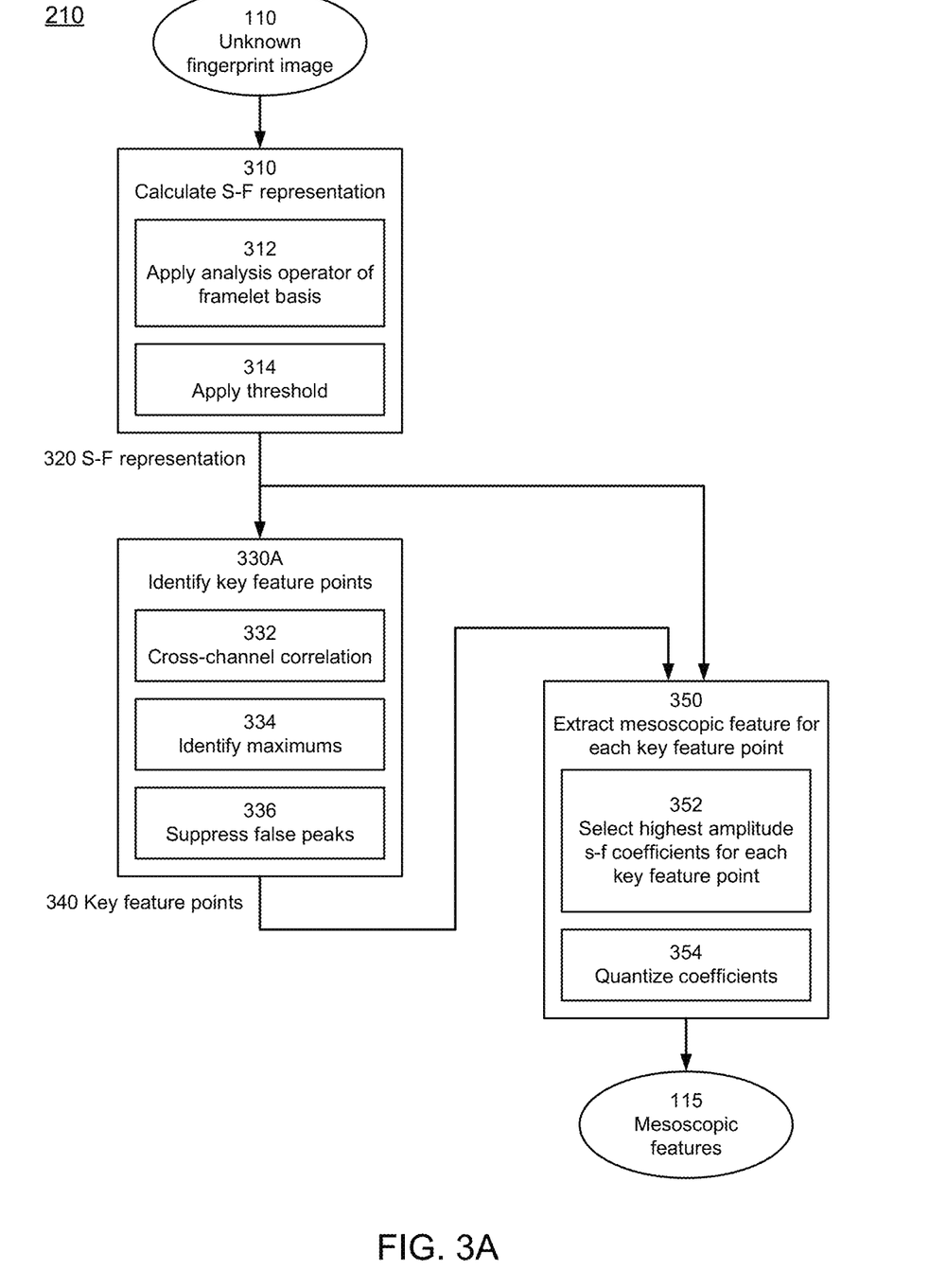
FIG. 3A is a flow diagram for calculating mesoscopic features from an unknown fingerprint image.
Figure 3B:
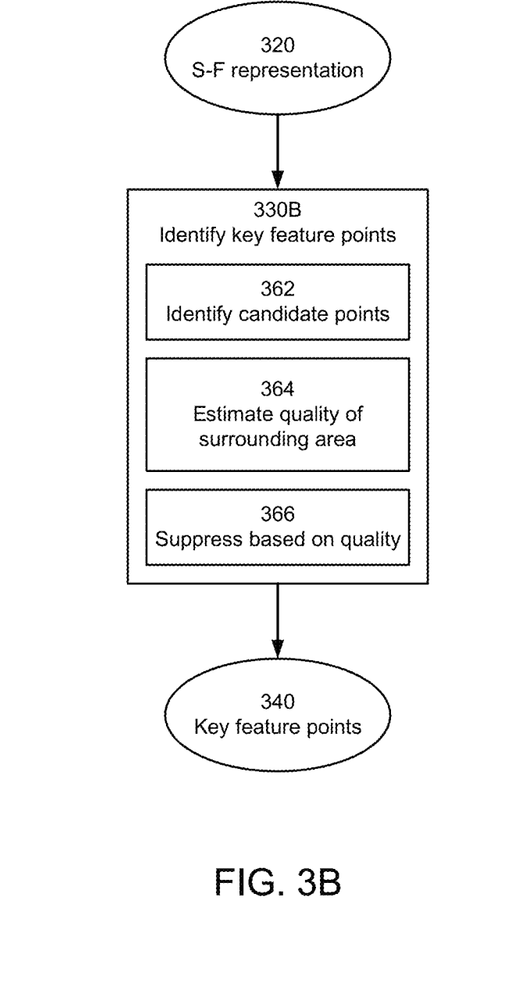
FIGS. 3B and 3C are flow diagrams for alternate methods for identifying key feature points.
Figure 3C:
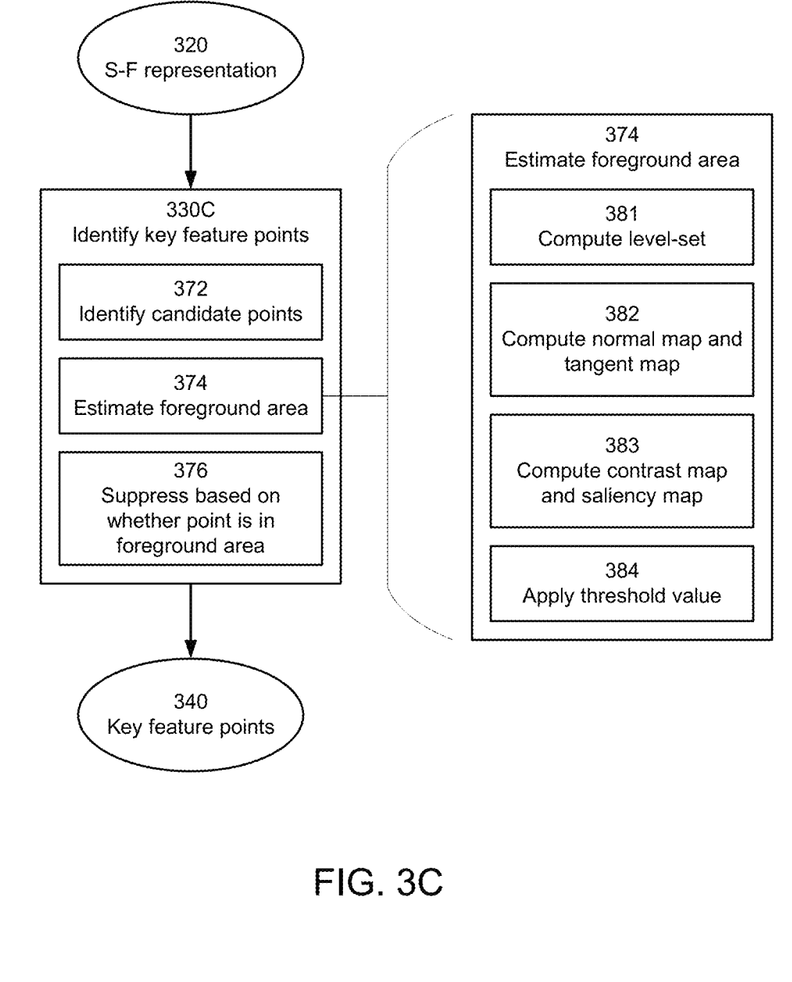

The initialization process implemented by the lefthand modules is described in the following text. FIGS. 3A-3C describe the representation process implemented by the modules in the middle column. The similarity scoring by the righthand modules is described in FIG. 4.

For the processing of image data, representations play a fundamental role. The most suitable representations vary for different visual tasks. For example, for display purposes, pixel-value-based representation is useful (recording RGB values for each pixel). For compression purposes, using local cosine basis or wavelet basis is useful. Fingerprint images have special structure as they mainly consist of ridges and textures of varying curvatures and patterns. As such, it is possible to construct a more useful customized representation for fingerprint images, rather than using the standard pixel-value-based representations.

Accordingly, the known fingerprint images are analyzed to develop a framelet basis that is optimized for fingerprint images. In one approach, the basis is optimal in the sense that among all wavelet frames that satisfy the perfect reconstruction condition, the constructed framelet basis provides the sparsest representation for fingerprint images.

The construction of the framelet basis is based on the theory of multi-resolution analysis (MRA). The starting point for practical multi-resolution analysis was introduced by Mallat (1989) and Meyer (1995). Wavelets are prominent examples. One advantage for MRA is that it comes with fast decomposition and reconstruction algorithms, which is important for making it a practical tool in image processing.

Wavelets can be generalized to wavelet frames, in which the orthogonality constraint is dropped. Wavelet frames retain the so called perfect reconstruction property. However, wavelet frames are predefined. A basis that is optimized for the specific data at hand would be even better. Accordingly, a framelet basis is constructed by solving the following optimization, which is a unitary extension principle equation:

$$\min_{a_1,\ldots,a_m} \sum_{j=1}^{N} \sum_{i=1}^{m} \Phi(v_{i,j}) \qquad (1)$$

$$\text{subject to } v_{i,j} = T_{a_i} x_j, \quad i = 1, \ldots, m$$

$$\{a_i\}_{i=1}^{m} \in Q$$

$$Q = \left\{ \{a_i\}_{i=1}^{m} : \sum_{l=1}^{m} \sum_{n \in \mathbb{Z}^d} a_l(Mn+j)\overline{a_l(Mn+k+j)} = |\det(M)|^{-1}\delta_k, \right. \\ \left. \forall k, j \in \mathbb{Z}^d \right\}.$$

The framelet basis has m decomposition filters $a_1, \ldots, a_m$. The framelet basis is constructed from the N known fingerprint images $x_j$. $T_{a_i}$ is the analysis or decomposition operator for filter $a_1$. The $v_{i,j}$ are the multi-dimensional coefficients obtained by applying the decomposition operator to the fingerprint image $x_j$. $\Phi$ is a sparsity inducing function. That is, $\Phi$ is a merit function that rewards sparsity in the coefficients $v_{i,j}$. The decomposition filters $a_1, \ldots, a_m$ are constrained to filters that satisfy the so called perfect reconstruction property, which is the last equation above. In that equation, M is the sampling matrix. If no down-sampling is involved, then M is the identity matrix. In addition, $\delta_k=1$ if k=0 and $\delta_k=0$ otherwise. Solving Eqn. 1 yields the framelet basis. In FIG. 2, the framelet determination module 201 performs this task, although it could be done separately offline.

Generally speaking, the framelet basis provides a multi-scale analysis and the set of filters $a_i$ includes filters of different scales. The filters $a_i$ typically are not orthogonal to each other. The multi-dimensional coefficients $v_{i,j}$ provide a space-frequency representation of the fingerprint image.

FIG. 3A is a flow diagram for calculating mesoscopic features from an unknown fingerprint image. This flow diagram starts with an unknown fingerprint image, but the same process may be used to calculate representations for the known fingerprint images.

The fingerprint image is processed to compute 310 a space-frequency representation of the fingerprint image. The fingerprint image is first pre-processed so that it has a relatively uniform contrast. The normalized fingerprint image is transformed 312 to a set of multi-dimensional coefficients based on the previously determined framelet basis. That is, the analysis operator for the framelet basis is applied 312 to the fingerprint image. The result is a set of multi-dimensional coefficients. These may be post-processed 314, for example by applying a threshold or using other techniques to suppress noise.

The resulting space-frequency representation is processed to identify 330A key feature points. The multi-dimensional coefficients have a tensor format. Each slice of the tensor is called a channel. A peak signal 334 and cross-channel correlation 332 of the channels are computed to obtain statistics. Noise is filtered 336 from these statistics, which are then aggregated to obtain a local peak representation, which are the key feature points 340.

Based on the key feature points 340 and the space-frequency representation 320 of the fingerprint images, mesoscopic features 115 are then extracted 350. The local peak map of the fingerprint image (i.e., key feature points 340) is computed as described earlier. The map is then coarse-grained. An adjacency graph describing the neighboring relations of maps of similar coefficients is built from the coarse-grained local peak map. The edges of the map are scanned for candidate singularity points 352. Local analysis of the candidate singularity points is performed to determine final features. In one approach (see FIG. 3C), the neighborhood of each candidate point in the level set is checked and, if the orientation distribution is ok, the point is accepted as a mesoscopic feature. These features may also be quantized 354.

FIGS. 3B and 3C are flow diagrams for alternate methods for identifying key feature points. These techniques will be explained separately, but the techniques of FIGS. 3A-3C may also be used in combination. The approach 330B of FIG. 3B takes into account the quality of the fingerprint image. Using deep neural networks, the quality of key feature points is evaluated. The key feature points include singularities of the ridge/valley lines or singularities of the space-frequency representation. For example, points along the smoothed lines with high curvature may be included. The space-frequency representation 320 of the fingerprint image is computed and candidate key feature points are extracted 362. Patches around the candidate feature points are sampled, where one or more deep neural networks assess 364 the quality of the patches. The deep neural networks may contain solely convolutional layers or both convolutional layers and fully connected layers, and may contain dual-stream and single-stream neural networks and dynamical system based neural networks. Candidate feature points with low quality are suppressed 366.

The approach 330C of FIG. 3C takes into account whether the key feature point lies in the foreground or background of the fingerprint image. The following examples uses only the foreground, but the background may also be used. Candidate feature points are identified 372. The foreground area is estimated 372 and then candidate points are suppressed 376 if they are not in the foreground area.

The side diagram shows one method for estimating 374 the foreground area. A level-set of the space-frequency representation is computed 381. The normal map and tangent map of the level-set are then computed 382. The contrast map and saliency map are computed 383 from the normal and tangent maps. The foreground and/or background are then obtained using a pre-defined or adaptively chosen threshold value 384.

Computing the background and/or foreground may also be based on deep neural networks. Using one or more deep neural networks, a background or foreground saliency map is computed from the space-frequency representation. Another background or foreground saliency map is computed as described in FIG. 3C. The two saliency maps are then combined to produce a final background or foreground area.

Figure 4:
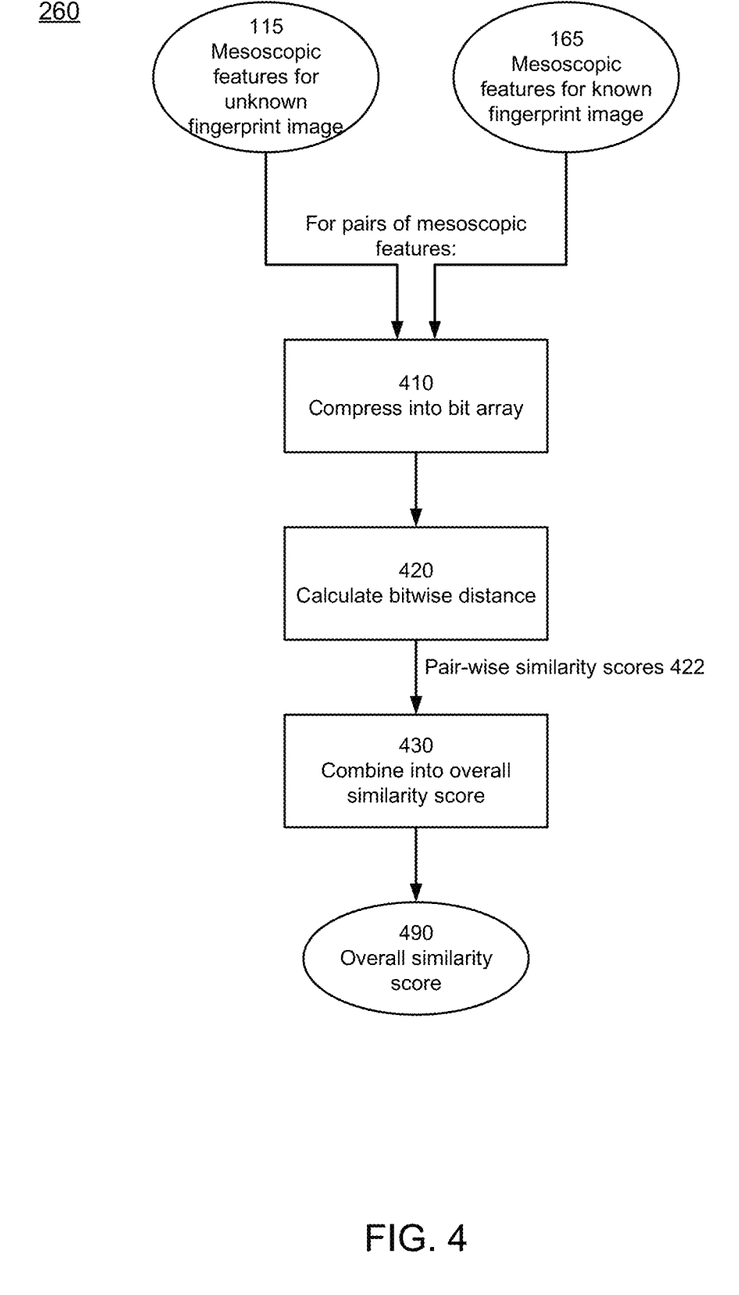
FIG. 4 is a flow diagram for calculating an overall similarity score between two fingerprint images.

FIG. 4 is a flow diagram for calculating an overall similarity score between two fingerprint images based on key feature points and mesoscopic features. The example of FIG. 4 may be implemented on a graphic processing unit (GPU). In other implementations, tensor processing units (TPU) or other AI-specific chips may be used. The features are compressed and transformed 410 into structured arrays, such as bit arrays. Matching is converted into bit operations on a GPU device. A pair-wise similarity score 422 is computed based on the bit comparison results, such as calculating 420 the bitwise distance between two mesoscopic features. The local scores are aggregated 430 to compute an overall similarity score 490 for pairs of fingerprint images. The scores provide a ranking of which known fingerprint images are most similar to the unknown fingerprint image.

In another variation, using deep neural networks, processed fingerprint images are classified to a pre-defined number of classes. Representations of the fingerprint image are computed. The fingerprint image is pre-computed using the deep neural network to get coarse features. A classifier in conjunction with the deep neural network is then used to obtain features of the fingerprint image as well as class label.

It is understood that the above-described embodiments are only illustrative of the application of the principles of the present invention. The present invention may be embodied in other specific forms without departing from its spirit or essential characteristics. For example, the fingerprint recognition techniques may also be combined with other conventional techniques, such as those based on minutia.

In all steps, pre-processing may apply. Possible pre-processing steps include normalizing the images or the representations, for example normalizing the contrast; removing non-usable areas; and enhancing the ridge/valley lines based on their spectra.

Alternate embodiments are implemented in computer hardware, firmware, software, and/or combinations thereof. Implementations can be implemented in a computer program product tangibly embodied in a computer-readable storage device for execution by a programmable processor; and method steps can be performed by a programmable processor executing a program of instructions to perform functions by operating on input data and generating output. Embodiments can be implemented advantageously in one or more computer programs that are executable on a programmable computer system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits), FPGAs and other forms of hardware.

The invention claimed is:

1. A method implemented on a computer system comprising a processor, the processor executing instructions to effect a method for matching an unknown fingerprint image against a database of known fingerprint images, the method comprising:
    applying an analysis operator of a space-frequency framelet basis to the unknown fingerprint image to obtain multi-dimensional coefficients that represent the unknown fingerprint image using the framelet basis, wherein the framelet basis is also used to represent the known fingerprint images and the framelet basis is determined by solving a unitary extension principle equation to obtain the framelet basis that is optimized for constructing space-frequency representations of the known fingerprint images;
    extracting multiple mesoscopic features of the unknown fingerprint image, wherein the multi-dimensional coefficients that represent the unknown fingerprint image contain at least two key feature points and each mesoscopic feature is based on the multi-dimensional coefficients in a local vicinity of one of the key feature points of the unknown fingerprint image;
    calculating overall similarity scores between the unknown fingerprint image and the known fingerprint images based on the mesoscopic features of the unknown fingerprint image and mesoscopic features of the known fingerprint images; and
    ordering the known fingerprint images according to their overall similarity scores.

2. The method of claim 1 wherein automatically extracting multiple mesoscopic features of the unknown fingerprint image comprises:
    identifying the key feature points of the unknown fingerprint image; and
    for each key feature point:
        selecting a set of highest amplitude coefficients for the multi-dimensional coefficients in the local vicinity of the key feature point; and
        quantizing the selected coefficients.

3. The method of claim 2 wherein the multi-dimensional coefficients in the local vicinity of the key feature point is a space-frequency hypercube of a predefined size around the key feature point, and the set of highest amplitude coefficients contains a predefined number of coefficients from the space-frequency hypercube.

4. The method of claim 1 further comprising:
    applying a threshold to the multi-dimensional coefficients.

5. The method of claim 1 further comprising identifying the key feature points of the unknown fingerprint image by:
    computing a cross-channel correlation of the multi-dimensional coefficients of the unknown fingerprint image, wherein the channels are tensor slices through the multi-dimensional coefficients;
    identifying maximums of the cross-channel correlations as peaks; and
    suppressing false peaks from among the identified peaks.

6. The method of claim 1 further comprising identifying the key feature points of the unknown fingerprint image by:
    identifying a plurality of candidate key feature points;
    estimating an image quality of areas around the candidate key feature points; and
    suppressing candidate key feature points based on the estimated image quality.

7. The method of claim 6 wherein estimating the image quality of areas around the candidate key feature points is performed by a neural network.

8. The method of claim 1 further comprising identifying the key feature points of the unknown fingerprint image by:
    identifying a plurality of candidate key feature points;
    estimating a foreground area of the unknown fingerprint image; and
    suppressing candidate key feature points based on whether the candidate key feature point lies outside the foreground area.

9. The method of claim 8 wherein estimating the foreground area of the unknown fingerprint image comprises:
    computing a level-set of the unknown fingerprint image;
    computing a normal map and a tangent map of the level-set;
    computing a contrast map and a saliency map from the normal map and the tangent map; and
    applying a threshold value to the contrast map and to the saliency map to estimate the foreground area.

10. The method of claim 8 wherein estimating the foreground area of the unknown fingerprint image comprises:
    using a neural network to compute a first saliency map;
    computing a second saliency map by:
        computing a level-set of the unknown fingerprint image;
        computing a normal map and a tangent map of the level-set;
        computing a contrast map and an intermediate saliency map from the normal map and the tangent map; and
        applying a threshold value to the contrast map and to the intermediate saliency map to estimate an intermediate foreground area; and
        transforming the intermediate foreground area to the second saliency map; and
    combining the first and second saliency maps to estimate the foreground area.

11. The method of claim 1 wherein automatically extracting multiple mesoscopic features of the unknown fingerprint image comprises:
    using a neural network to identify key feature points of the unknown fingerprint image; and
    extracting the multiple mesoscopic features based on the key feature points.

12. The method of claim 1 wherein extraction of mesoscopic features for at least one known fingerprint image was performed using at least one different parameter than used for the extraction of mesoscopic features for the unknown fingerprint image.

13. The method of claim 12 wherein the different parameter includes at least one of a window size of the multi-dimensional coefficients in the local vicinity of the key feature point, a thresholding value, a number of channels, and parameters for neural networks.

14. The method of claim 1 wherein calculating the overall similarity score between the unknown fingerprint image and one of the known fingerprint images comprises:
for different pairs of mesoscopic features, each pair containing one mesoscopic feature from the unknown fingerprint image and one mesoscopic feature from the known fingerprint image, calculating a similarity score between the two mesoscopic features in the pair; and
combining the similarity scores for the different pairs of mesoscopic features to obtain an overall similarity score.

15. The method of claim 14 wherein calculating the similarity score between two mesoscopic features comprises:
using a neural network to calculate the similarity score.

16. The method of claim 14 wherein calculating the similarity score between the mesoscopic features in the pair comprises:
compressing the mesoscopic features for each fingerprint image into a bit array; and
calculating a bitwise distance between the bit arrays for the mesoscopic features.

17. The method of claim 16 wherein the bitwise distance is calculated by a GPU, TPU or AI-specific chip.

18. The method of claim 1 wherein the framelet basis results in multi-dimensional coefficients that are more sparse than a set of multi-dimensional coefficients resulting from a set of orthogonal wavelets with a same dimensionality.

19. The method of claim 1 wherein the framelet basis is optimized for sparseness.

20. A system for matching fingerprint images, the system comprising:
a database of known fingerprint images, wherein a framelet basis is used to represent the known fingerprint images and the framelet basis is determined by solving a unitary extension principle equation to obtain the framelet basis that is optimized for constructing space-frequency representations of the known fingerprint images;
a fingerprint matching engine comprising:
a space-frequency analysis module that applies an analysis operator of the framelet basis to the unknown fingerprint image to obtain multi-dimensional coefficients that represent the unknown fingerprint image using the framelet basis;
a feature extraction module that extracts multiple mesoscopic features of the unknown fingerprint image, wherein the multi-dimensional coefficients that represent the unknown fingerprint image contain at least two key feature points and each mesoscopic feature is based on the multi-dimensional coefficients in a local vicinity of one of the key feature points of the unknown fingerprint image; and
a comparison module that calculates overall similarity scores between the unknown fingerprint image and the known fingerprint images based on the mesoscopic features of the unknown fingerprint image and mesoscopic features of the known fingerprint images.

* * * * *